(12) United States Patent
Santolalla et al.

(10) Patent No.: US 8,960,603 B2
(45) Date of Patent: Feb. 24, 2015

(54) IMPACT RESISTANT AND DAMAGE TOLERANT AIRCRAFT FUSELAGE

(75) Inventors: Eduardo Vinué Santolalla, Madrid (ES); César Bautista de La Llave, Madrid (ES); Pablo Timoteo Sanz Martínez, Madrid (ES); Diego Folch Cortés, Madrid (ES); Esteban Martino Gonzáles, Madrid (ES); Ana Reyes Moneo Peñacoba, Burgos (ES)

(73) Assignee: Airbus Operations S.L., Getafe, Madrid (ES)

( * ) Notice: Subject to any disclaimer, the term of this patent is extended or adjusted under 35 U.S.C. 154(b) by 378 days.

(21) Appl. No.: 13/027,661

(22) Filed: Feb. 15, 2011

(65) Prior Publication Data

US 2011/0233335 A1      Sep. 29, 2011

(30) Foreign Application Priority Data

Mar. 29, 2010      (ES) .................................. 201030468

(51) Int. Cl.
| | |
|---|---|
| *B64C 1/00* | (2006.01) |
| *B64D 27/14* | (2006.01) |
| *B64C 1/06* | (2006.01) |
| *B64C 1/12* | (2006.01) |
| *B64D 27/02* | (2006.01) |

(52) U.S. Cl.
CPC .............. *B64D 27/14* (2013.01); *B64C 1/061* (2013.01); *B64C 1/064* (2013.01); *B64C 1/065* (2013.01); *B64C 1/068* (2013.01); *B64C 1/12* (2013.01); *B64D 2027/026* (2013.01)
USPC .......................................... 244/119; 244/54

(58) Field of Classification Search
USPC ............ 244/54, 117 R, 119, 120, 121, 118.1, 244/118.2
See application file for complete search history.

(56) References Cited

U.S. PATENT DOCUMENTS

| 4,593,870 A | 6/1986 | Cronkhite et al. |
|---|---|---|
| 2006/0243854 A1 | 11/2006 | Townshend et al. |
| 2007/0246603 A1 * | 10/2007 | Udall et al. ..................... 244/54 |
| 2009/0140096 A1 | 6/2009 | Verde Preckler |

FOREIGN PATENT DOCUMENTS

| ES | 178645 | 8/1947 |
|---|---|---|
| WO | WO 2009068638 A1 * | 6/2009 |

OTHER PUBLICATIONS

Niu, Michael Chun-Yung (1999). Airframe Structural Design—Practical Design Information and Data on Aircraft Structures (2nd Edition). (pp. 391, 396-398, 406-408, 412-414, 472, 487-488).*

* cited by examiner

*Primary Examiner* — Philip J Bonzell
*Assistant Examiner* — Michael Kreiner
(74) *Attorney, Agent, or Firm* — Michael Best & Friedrich LLP

(57) ABSTRACT

An aircraft fuselage part (31) located in a section of an aircraft (11) having a propulsion system (13) attached by upstream pylons (17), the fuselage part includes a skin (35); a plurality of frames (37) arranged perpendicularly to a longitudinal axis (33); a single or internally divided upper longitudinal box (41) and a single or internally divided lower longitudinal box (51) which are configured to form with the skin (35) a multi-cell structure, belonging in each cell the external side to the skin (35) and the internal sides to the longitudinal boxes (41, 51); a plurality of lateral beams (61) that are interconnected with the frames (37) to form together with the skin (35) a structural unity. The fuselage components (35, 37, 41, 51, 61) are dimensioned so that the aircraft can withstand the effect of pre-defined failure events keeping a sufficient number of closed cells.

17 Claims, 3 Drawing Sheets

IMPACT RESISTANT AND DAMAGE TOLERANT AIRCRAFT FUSELAGE

FIELD OF THE INVENTION

The present invention relates to a fuselage part of an aircraft with propeller engines and more particularly to an impact resistant and damage tolerant fuselage part.

BACKGROUND OF THE INVENTION

There are known commercial aircrafts (CBA vector 123, SARA, AVANTI, 7J7) powered with propeller engines located in the rear part of the aircraft supported by the fuselage by means of pylons.

One of the problems raised by this aircraft configuration is related to failure events such as a PBR ("Propeller Blade Release") event, i.e. an event where a blade of one of the propeller engines comes off and hits the fuselage, an UERF ("Uncontained Engine Rotor Failure") event, i.e. an event where a part of the rotor of the engine breaks, it is released and hits the fuselage, an ice shedding event where ice shedding created in the tips of the blades can be thrown at high speed over the fuselage, or any other "Large Damage" event.

The design of said rear fuselage shall therefore take into account such events and guarantee its capability for maintaining stability and proceed to a safe landing, i.e. shall be an impact resistant and damage tolerant fuselage.

As a consequence of the failure in the engine, one of the blades of the propeller engine or any other engine component can be detached and impact against the rear fuselage at high speed, sectioning it. In this emergency condition, the aircraft operates with only one engine generating a forward thrust outside the plane of symmetry of the airplane. This thrust causes a yawing moment which must be balanced with a side aerodynamic force caused by the vertical tail plane of the empennage, so that the aircraft can continue navigating stably. As the vertical tail plane is located above the rear fuselage, this side aerodynamic force generates a torsion along the rear fuselage. If the blade impacts against the fuselage and sections it, the torsional strength of the fuselage is considerably reduced because the torsional rigidity of a closed section is proportional to the total area enclosed by the section, whereas the torsional rigidity of an open section is proportional to the material area of the section.

Propeller engines may also be in the wing such that the detachment of a propeller blade can impact the central fuselage in front of the wing. In this area of the fuselage, the torsion that the mentioned fuselage must support is relatively low, and do not involve a critical emergency condition. However, this condition changes when the propeller engines are located at the rear part of the aircraft in front of the empennage, because then the torque generated by the empennage due to the failure of an engine is very high and can cause a catastrophic situation for the aircraft which must be prevented.

As it is well known, weight is a fundamental aspect in the aeronautic industry and therefore there is a current trends to use composite material instead metallic material even for primary structures.

The composite materials that are most used in the aeronautical industry consist of fibers or fiber bundles embedded in a matrix of thermosetting or thermoplastic resin, in the form of a preimpregnated or "prepreg" material. Its main advantages refer to:
  Their high specific strength with respect to metallic materials. It is the strength/weight equation.
  Their excellent behavior under fatigue loads.
  The possibilities of structural optimization thanks to the anisotropy of the material and the possibility of combining fibers with different orientations, allowing the design of the elements with different mechanical properties adjusted to the different needs in terms of applied loads.

WO 2009/068638 discloses an impact resistant fuselage made with composite materials comprising an outer skin and an inner skin, both skins being joined by means of radial elements configuring then a multi-cell structure providing the required torsional strength in the rear part of said aircrafts.

The present invention is also addressed to attend the aeronautical industry demand related to rear fuselages subjected to said failure events and propose a different solution than WO 2009/068638.

SUMMARY OF THE INVENTION

It is an object of the present invention to provide a fuselage part for an aircraft having attached a propulsion system to the fuselage by means of upstream pylons, highly resistant to the torsional loads produced in case of a failure event such as a PBR event or an UERF event.

It is another object of the present invention to provide a fuselage part for an aircraft having attached to the fuselage a propulsion system by means of upstream pylons, having an impact resistant structure to withstand a failure event such as a PBR event, a UERF event or an ice shedding event.

It is another object of the present invention to provide a fuselage part for an aircraft having attached to the fuselage a propulsion system by means of upstream pylons, having a damage tolerant structure to withstand a failure event such as a PBR event, a UERF or an ice shedding event.

These and other objects are met by an aircraft fuselage part, the transversal section of said fuselage part having a curved shape with at least a vertical symmetry plane and a central longitudinal axis, the fuselage part comprising a skin, a plurality of frames arranged perpendicularly to said longitudinal axis, the fuselage part also comprising a single or internally divided upper longitudinal box and a single or internally divided lower longitudinal box which are configured to form together with the skin a multi-cell structure, belonging in each cell the external side to the skin and the internal sides to said longitudinal boxes; the fuselage part also comprising a plurality of lateral beams that are interconnected with said frames to form together with the skin a structural unity; said fuselage part components being dimensioned so that the aircraft can withstand the effect of pre-defined failure events keeping a sufficient number of closed cells.

In a preferred embodiment said pre-defined failure events comprise one or more of the following: a PBR event; an UERF event; an ice shedding event. Hereby it is achieved an aircraft fuselage part able to withstand those failure events that shall be desirably taken into account in its design.

In preferred embodiments said upper longitudinal box is divided in a central rectangular box and two lateral triangular boxes, the frames have extended webs inside said boxes and joined to them, and it is dimensioned so that in case of one of said pre-defined failure events at least two of said three boxes remain as closed boxes. Hereby it is achieved an aircraft fuselage part with a suitable upper multi-cell structure for providing a high resistant and damage tolerant fuselage structure.

In another preferred embodiments said lower longitudinal box is divided in two rectangular boxes and it is dimensioned so that in case of one of said pre-defined failure events at least one of said two boxes remain as a closed box. Hereby it is achieved an aircraft fuselage part with a suitable lower multi-cell structure for providing a high resistant and damage tolerant fuselage structure.

In another preferred embodiment the main elements of the aircraft fuselage part are made with composite materials. Hereby it is achieved an aircraft fuselage part with a high resistant and damage tolerant structure optimized in weight.

In another preferred embodiment the aircraft fuselage part is the rear end fuselage of an aircraft with an empennage behind the propulsion system.

Other characteristics and advantages of the present invention will be clear from the following detailed description of embodiments illustrative of its object in relation to the attached figures.

DETAILED DESCRIPTION OF THE INVENTION

Figure 1A:
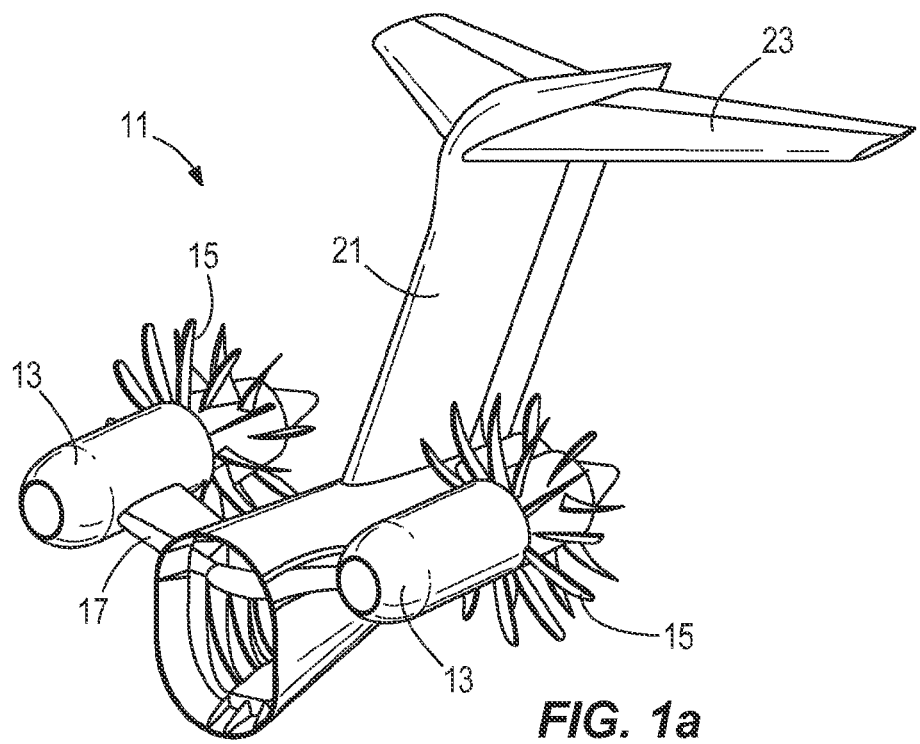
FIGS. 1a and 1b show, respectively, schematic perspective and plan views of the rear part of an aircraft whose fuselage will be configured according to the present invention.
Figure 1B:
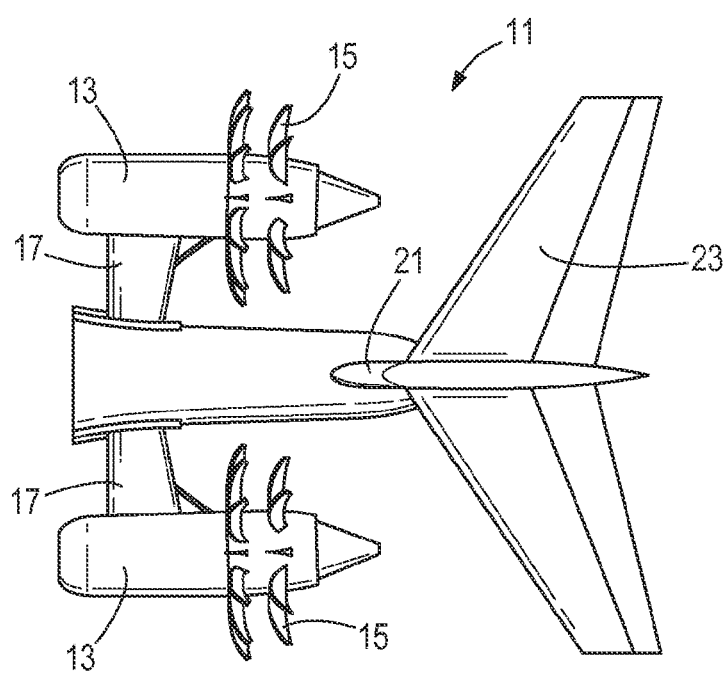

In an aircraft 11 having a propulsion system 13 with propeller blades 15 attached to the rear part of the fuselage by means of upstream pylons 17 there is a risk of undergoing a severe damage in the event that a propeller blade 15 is detached and impacts the rear fuselage with high energy. In the aircraft 11 shown in FIGS. 1a and 1b the empennage comprises a vertical tail plane 21 and an upper horizontal tail plane 23 behind the propulsion system 13.

Figure 2:
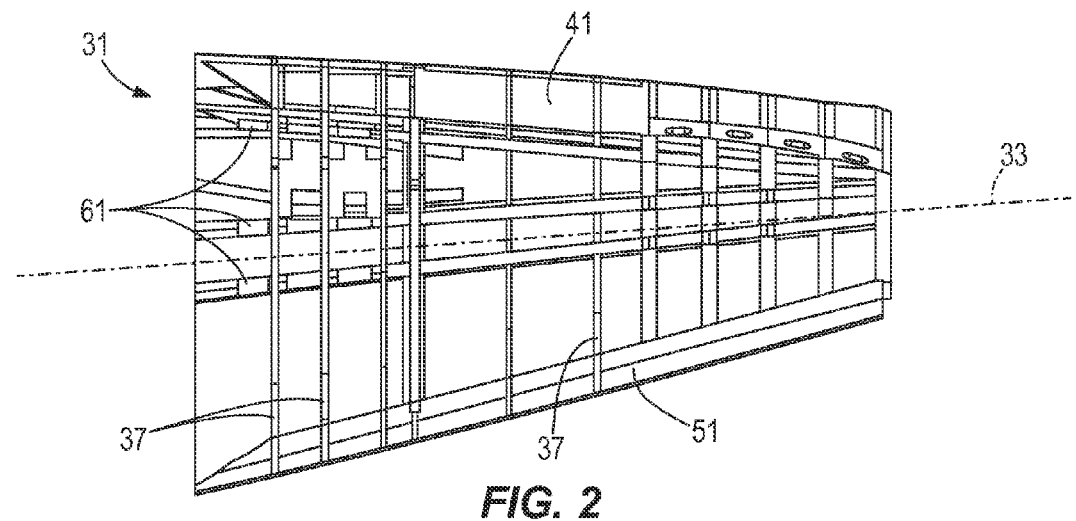
FIG. 2 shows a schematic lateral view of the internal structure of an aircraft fuselage part according to the present invention.

The aircraft fuselage part 31 affected by said risk or any other of the above-mentioned risks is designed according to a preferred embodiment of the present invention as shown in FIG. 2 with an internal structure comprising as main elements a plurality of frames 37, a plurality of lateral beams 61, an upper longitudinal box 41, a lower longitudinal box 51 and a skin (not shown in FIG. 2).

Figure 3A:
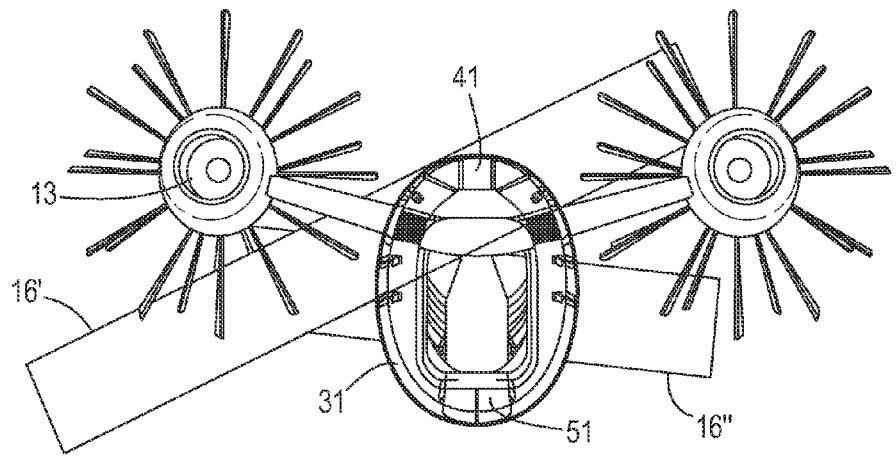
FIGS. 3a, 3b and 3c show schematic frontal views of an aircraft with a fuselage part according to the present invention damaged by the impact of a blade detached from one of its engines following different trajectories.
Figure 3B:
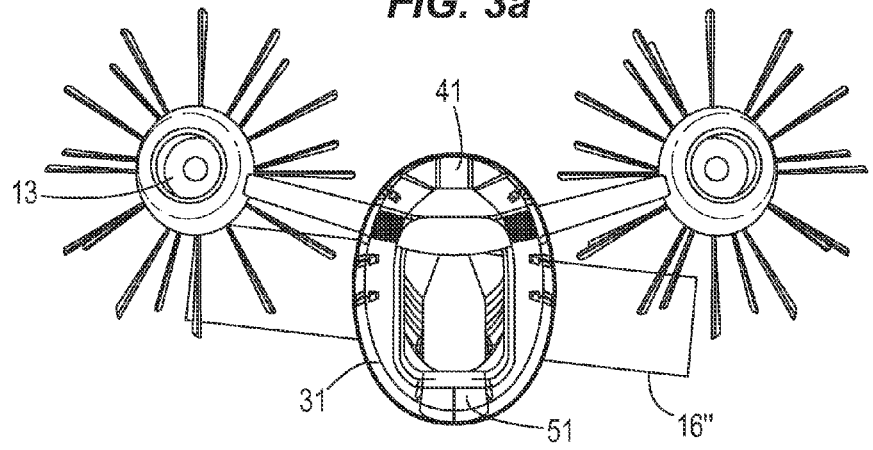
Figure 3C:
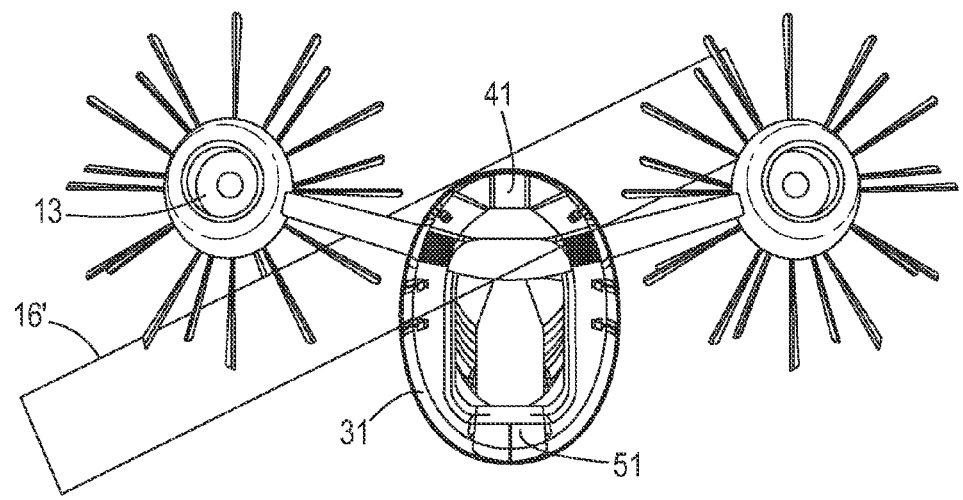

It is considered firstly that this structural design provides the aircraft fuselage part 31 with a high torsional strength to deal with an event of detachment of a propeller blade 15 from an engine 13 causing on one side a torsion over the fuselage due to the yawing moment generated by the stop of the engine 13 and the torque generated by the empennage to balance said yawing moment, and causing on the other side damages to the fuselage if the detached blade impacts on it that obviously reduce its torsional strength. As illustrated in FIGS. 3a, 3b and 3c in the event of the impact of a detached blade following different trajectories 16', 16" there will a sufficient number of closed areas in fuselage part 31 to provide the needed torsional rigidity.

Secondly it is considered that this structural design provides a bending stiffness and a lateral reinforcement that contributes to achieve a damage tolerant structure capable to cope with the damages caused by the impact of a propeller blade 15 detached from an engine 13.

Figure 4:
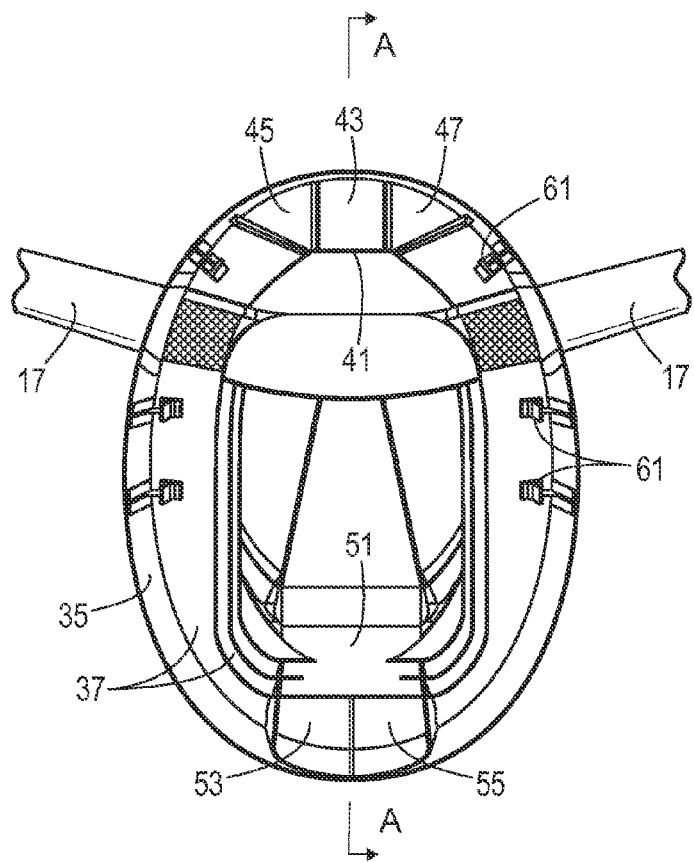
FIG. 4 shows a frontal view of an aircraft fuselage part according to a preferred embodiment of the present invention.

In the preferred embodiment shown in FIG. 4 it can be seen that the upper longitudinal box 41 is divided in a central rectangular box 43 and two lateral triangular boxes 45, 47 and the lower longitudinal box 51 is divided in two rectangular boxes 53, 55 at each side of the vertical symmetry plane A-A.

An important feature of the invention is that said upper and lower longitudinal boxes 41, 51 and said frames 37 shall be configured to form together with the skin 35 a multi-cell structure. The frames 37 have extended webs inside said upper longitudinal box 41 joined to its walls, that may have internal holes.

The main components of the aircraft fuselage part 31, i.e. the skin 35, the frames 37, the upper and lower boxes 41, 51 and the lateral beams 61 shall be dimensioned so that aircraft can withstand the effect of any pre-defined failure event being considered keeping a sufficient number of closed cells. In this respect, it is considered that in the above mentioned preferred embodiment, two of the three boxes 43, 45, 47 of the upper longitudinal box 41 and one of the two boxes 53, 55 of the lower longitudinal box 51 shall remain as closed boxes in any of those failure events being considered in the aircraft design.

As the skilled man will easily understand the aircraft fuselage part 31 according to the present invention will have special sections for those areas receiving loads from the pylons 17 and the vertical tail plane 21.

One advantage of the present invention is that the main elements of the aircraft fuselage part 31 that form its internal structure i.e. the frames 37, boxes 41, 51 and beams 61 can be configured so that the whole internal structure can be manufactured as a single unit to which the skin 35 is joined in a further step allowing an optimized rear end fuselage both in weight and manufacturability.

An additional advantage of the present invention is that the multi-cell structure of the fuselage 31 reduces the noise caused by propulsion system 13 and propagated through the skin 35 that reaches the passenger cabin.

Although the present invention has been fully described in connection with preferred embodiments, it is evident that modifications may be introduced within the scope thereof, not considering this as limited by these embodiments, but by the contents of the following claims.

The invention claimed is:

1. An aircraft fuselage section located in an aircraft and having pylons for supporting a propulsion system, a transversal section of said fuselage section having a curved shape with at least a vertical symmetry plane and a central longitudinal axis, the fuselage section comprising:
    a skin;
    a plurality of frames arranged perpendicularly to said longitudinal axis;
    an upper longitudinal box extending from one frame to another frame and a lower longitudinal box extending from one frame to another frame, both of which are configured to form together with the skin a closed multi-cell structure, each closed cell including an external side defined by the skin and internal sides defined by said longitudinal boxes; and
    a plurality of lateral beams that are interconnected with said frames to form together with the skin a structural unity,
    wherein the closed multi-cell structure provides torsional rigidity and bending stiffness to the aircraft fuselage section; and
    wherein each of the plurality of frames includes a first frame portion and a second frame portion, wherein the first frame portion extends at least between a first internal side of said lower longitudinal box and a first internal side of said upper longitudinal box, and wherein the second frame portion extends at least between a second internal side of said lower longitudinal box and a second internal side of said upper longitudinal box.

2. The aircraft fuselage section according to claim 1, wherein the upper longitudinal box is divided into three boxes including a central rectangular box and two lateral triangular boxes.

3. The aircraft fuselage section according to claim 2, wherein the frames have extended webs inside said boxes and joined to them.

4. The aircraft fuselage section according to claim 2, wherein, in response to a pre-defined failure event, at least two of said three boxes of the upper longitudinal box remain as closed boxes.

5. The aircraft fuselage section according to claim 4, wherein said pre-defined failure event comprises at least one of the following:
- a propeller blade release ("PBR") event;
- an uncontained engine rotor failure ("UERF") event; and
- an ice shedding event.

6. The aircraft fuselage section according to claim 1, wherein the lower longitudinal box is divided into two rectangular boxes at each side of the vertical symmetry plane.

7. The aircraft fuselage section according to claim 6, wherein, in response to a pre-defined failure event, at least one of said two boxes of the lower longitudinal box remains as a closed box.

8. The aircraft fuselage section according to claim 1, wherein the skin, the frames, the upper longitudinal box, the lower longitudinal box, and the lateral beams are made from composite materials.

9. The aircraft fuselage section according to claim 1, wherein the fuselage section is located proximate the rear end of an aircraft having an empennage attached behind the propulsion system.

10. The aircraft fuselage section according to claim 1, wherein the upper longitudinal box extends in a direction generally parallel to the longitudinal axis.

11. The aircraft fuselage section according to claim 1, wherein at least one of the upper longitudinal box and the lower longitudinal box extends from a position proximate the pylons to a position aft of the pylons.

12. The aircraft fuselage section according to claim 1, wherein at least one of the upper longitudinal box and the lower longitudinal box includes a web extending through at least a portion of one of the closed cells.

13. The aircraft fuselage section according to claim 12, wherein the web is formed as a portion of one of the frames.

14. The aircraft fuselage section according to claim 1, wherein at least some of the plurality of frames and at least one of the upper longitudinal box and the lower longitudinal box are formed as a unitary structure.

15. The aircraft fuselage section according to claim 1, wherein the upper longitudinal box is positioned above the longitudinal axis and the lower longitudinal box is positioned below the longitudinal axis.

16. The aircraft fuselage section according to claim 1, wherein the skin defines an uppermost portion positioned vertically above the longitudinal axis, wherein the upper longitudinal box is positioned proximate the uppermost portion.

17. The aircraft fuselage section according to claim 1, wherein the skin defines a lowermost portion positioned vertically below the longitudinal axis, wherein the lower longitudinal box is positioned proximate the lowermost portion.

* * * * *